Aug. 22, 1944.
S. SWEDLOW
2,356,187
APPARATUS FOR ELECTRICAL ZEROIZING
Filed May 17, 1943
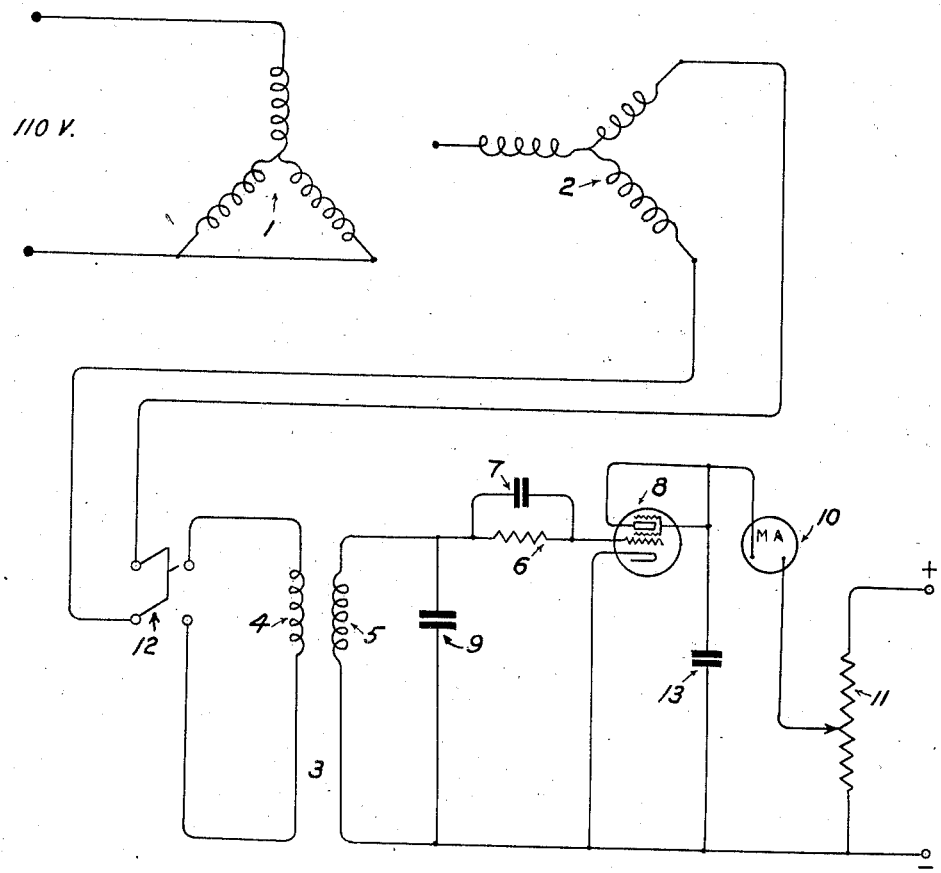
Inventor
Samuel Swedlow Patented Aug. 22, 1944

2,356,187

UNITED STATES PATENT OFFICE 2,356,187

APPARATUS FOR ELECTRICAL ZEROIZING

Samuel Swedlow, New York, N. Y.

Application May 17, 1943, Serial No. 487,274

2 Claims. (Cl. 171—95)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an improved apparatus for indicating the approach of differential electrical circuits to a balanced or zero position. This invention is particularly applicable for indicating the degree of electrical alignment of the rotor and stator windings of a dynamo electric machine of the type known as self synchronous induction motors or generators.

There are many applications in the electrical industry wherein it is necessary to measure voltages or currents which are varied by some circuit element over a large range of values and where the most accurate measurement of such voltages and currents is required in the region where such voltage and current approach a zero value. This is particularly true of the voltage measurements necessary in connection with the positioning of the rotor of a self synchronous induction motor or generator in its electrical zero position with respect to the stator winding. In this position the rotor windings are mechanically perpendicular with respect to the stator windings and hence if an A. C. voltage is applied to the stator windings there will be no voltage generated in the rotor winding at the exact zero position. However, any slight variation of the angular mechanical position of the rotor with respect to the stator from such zero position results in the generation of an appreciable voltage in the rotor winding which increases in proportion to the extent of angular departure of the rotor from the electrical zero position.

The zeroizing of such self synchronous induction motors and generators has heretofore been accomplished by connecting the stator to a source of rated voltage. A voltmeter is then connected across one of the rotor circuits and, if the machine is of the multiphase type, the remaining rotor coils are left in an open circuit condition. Under such conditions a variable voltage will be applied to the voltmeter which approaches zero as the angular position of the rotor approaches the zero position. However, until the rotor is within 1° of its zero position, the voltage produced in the rotor winding is of the order of 10 to 20 volts. For accurate zeroizing, it is desirable to utilize a meter reading on the order of .01 volt. It is therefore necessary to insert several ranges of protective resistances in series with the meter and approach the final zero position by a cascading process wherein the rotor is moved to a position producing zero reading on the meter with all of the protective resistance in series, then removal of a portion of the protective resistance, a second adjustment of the rotor position to bring the meter reading to zero, and repeating in a succession of steps until the voltmeter is connected directly across the rotor winding. However, the slightest movement of the rotor while the voltmeter is thus connected will produce a voltage many times in excess of the rated voltage of the meter and it will be apparent that the number of sensitive voltmeters damaged by such a zeroizing method is excessive. Other circuits raising similar problems of voltage or current measurement or indication will be readily suggested to those skilled in the art.

Accordingly, it is an object of this invention to provide an improved voltage or current indicating apparatus.

A further object of this invention is to provide an alternating current voltage indicating circuit which will not only provide highly sensitive indication of voltages in the range approaching zero voltage but which may also be subjected to relatively high voltages without injury to the apparatus.

A particular object of this invention is to provide a voltage indicating apparatus and method particularly adaptable for the electrical zeroizing of rotary transformers or self synchronous induction wherein the indicating instrument must be sensitive to voltages of the order of .01 volt and yet be capable of sustaining the application of several hundred volts without change in the indicating circuit.

The specific nature of the invention as well as other objects and advantages thereof will clearly appear from a description of a preferred embodiment as shown in the accompanying drawing.

In accordance with this invention an electronic tube circuit is provided having a sensitive milliammeter connected in the output of such circuit. The circuit arrangements are such that the application of zero voltage to the input of the circuit will result in a full scale deflection of the sensitive milliammeter in the output circuit. Any increase in the input voltage will react to reduce the current in the output of the electronic tube circuit and hence reduce the reading of the milliammeter. Thus input voltages of the order of several hundred volts may be applied to such circuit without danger of injuring the sensitive milliammeter in the output circuit or any other component of the indicating circuit.

A circuit in accordance with this invention is particularly adaptable to the indication and measurement of alternating currents and voltages. An alternating current voltage applied to the input of the circuit is applied to the grid of a suitable electronic tube which is connected to suitable operating voltages and impedances to act as a grid leak detector. The static operating conditions of such tube are selected so that its output current, or a suitable portion thereof, produces a full scale deflection on a milliammeter reading on the order of one milliampere. With such an arrangement the application of an alternating current voltage to the input of the circuit produces a negative voltage on the grid in accordance with the well known principle of grid leak detection. Hence the D. C. output current of the electronic tube is reduced and the reading of the sensitive milliammeter drops off from its static full scale position.

In Fig. 1 an embodiment of this invention is shown which is particularly adaptable to the zeroizing of self synchronous induction motors and generators. The stator windings 1 of such rotary transformer, which is shown for the purpose of illustration as of the three phase winding type, is connected across a suitable source of low frequency alternating current. The terminals of two of the rotor coils 2 are connected through a switch 12 to the primary winding 4 of the low frequency transformer 3. One terminal of the secondary winding 5 of the transformer 3 is connected through a grid leak resistor 6 and condenser 7 to the grid of a suitable electronic tube 8. The other terminal of the secondary winding 5 of the input transformer 3 is connected to the cathode of tube 8. A suitable high frequency filter condenser 9 is connected across secondary winding 5.

The plate and screen grid of tube 8 are connected through a sensitive D. C. milliammeter 10 to a variable tap on a voltage divider 11 which is connected across a suitable source of positive voltage. A low frequency by-pass condenser 13 is connected from the anode to the cathode of the tube 8.

The plate voltage of the tube 8 is adjusted by the voltage divider 11 to such point that with switch 12 open, and hence zero voltage applied across the input winding 4 of transformer 3, the current through the milliammeter 10 will produce a full scale deflection of that meter or any other desired fixed reading. The switch 12 may then be closed connecting the indicating circuit across the rotor of the rotary transformer which is desired to be set to its electrical zero position. The initial position of such rotor is of course a matter of chance and hence if it is angularly displaced to any extent from its electrical zero position a voltage on the order of a hundred volts may be applied across the primary of input transformer 3. The effect of such voltage, however, by operation of the principle of grid leak detection produces an increase in the negative bias on the grid of tube 8. Hence the D. C. output current of tube 8 is reduced and accordingly the reading of the milliammeter 10 will be reduced below its static value by an amount dependent upon the magnitude of the voltage generated in the rotor windings 2.

The rotor may then be brought gradually to its electrical zero position by observing the deflection of the milliammeter 10. As the rotor approaches its zero position reading the milliammeter 10 will approach its full scale or the other selected value. It will be noted that due to the characteristics of grid leak detection that this circuit reaches a maximum sensitivity condition when the input voltage approaches zero. Accordingly, voltages on the order of .001 volt may be accurately indicated on the milliammeter 10 and the positioning of the rotor 2 of the self synchronous induction motor in its electrical zero position may be accomplished with all necessary accuracy. At the same time there is no opportunity for damage to occur to sensitive milliammeter 10 due to the larger voltages which are generated in the rotor windings 2 when it is displaced from its position to the electrical zero.

It will be readily apparent that an indicating circuit in accordance with this invention is adaptable without modification to voltage null indicating over a wide range of frequencies. A tuned input circuit is not necessary for the application of the A. C. voltage to the grid of tube 8 by reason of the fact that a reading is obtained from the indicating circuit only at the minimum or zero value of the input voltage of the applied A. C. voltage. At such point a maximum reading of the D. C. indicator is obtained irrespective of the particular frequency of the applied voltage.

The particular embodiment described above has been chosen as illustrative of this invention and it will be apparent that various other modifications may be made without departing from the spirit and scope of this invention, which modifications I aim to cover by the appended claims.

I claim:

1. An A. C. voltage indicating circuit comprising a grid controlled electronic tube, indicating means responsive to D. C. current connected in the output of said tube, the operating voltages of said tube being selected to produce a D. C. output current of safe value for said indicating means with zero A. C. voltage applied to the grid of said tube, means for applying to the grid circuit of said tube an A. C. voltage of variable magnitude, a shunt connected resistance and capacitance connected in the said grid circuit arranged to produce a negative bias on said grid proportional to said applied A. C. voltage whereby a maximum reading of said indicating means is obtained at the minimum value of said applied A. C. voltage.

2. An A. C. voltage null indicating circuit comprising a grid controlled electronic tube, a direct current indicating meter in the output circuit of said tube, a shunt resistance capacitance network in the grid circiut of said tube whereby said tube will function as a grid leak detector, operating voltages applied to said tube of such value as to produce a desired deflection on said meter with zero A. C. voltage applied to the grid of said tube and means for applying to said grid an A. C. voltage proportional to the voltage to be indicated.

SAMUEL SWEDLOW.